US006181990B1

(12) United States Patent
Grabowsky et al.

(10) Patent No.: US 6,181,990 B1
(45) Date of Patent: Jan. 30, 2001

(54) AIRCRAFT FLIGHT DATA ACQUISITION AND TRANSMISSION SYSTEM

(75) Inventors: John Francis Grabowsky, Camarillo; David Ray Stevens, Simi Valley, both of CA (US)

(73) Assignee: Teledyne Technologies, Inc., Los Angeles, CA (US)

(*) Notice: Under 35 U.S.C. 154(b), the term of this patent shall be extended for 0 days.

(21) Appl. No.: 09/126,156

(22) Filed: Jul. 30, 1998

(51) Int. Cl.[7] .............................. H04B 7/00; G06F 17/40; G06F 13/00
(52) U.S. Cl. ............................ 701/14; 701/35; 455/431
(58) Field of Search ...................... 701/14, 3, 24, 701/35; 455/431, 422, 456

(56) References Cited

U.S. PATENT DOCUMENTS

| Re. 35,590 | 8/1997 | Bezos et al. . | |
|---|---|---|---|
| 4,729,102 | 3/1988 | Miller, Jr. et al. . | |
| 4,804,937 | * 2/1989 | Barbiaux et al. ................ | 340/459 |
| 4,926,331 | 5/1990 | Windle et al. . | |
| 4,939,652 | * 7/1990 | Steiner ............................ | 701/35 |
| 5,124,915 | * 6/1992 | Krenzel .......................... | 702/5 |
| 5,185,700 | 2/1993 | Bezos et al. . | |
| 5,283,767 | * 2/1994 | McCoy ........................... | 367/4 |
| 5,400,018 | 3/1995 | Scholl et al. . | |
| 5,440,544 | * 8/1995 | Zinser, Jr. ....................... | 370/319 |
| 5,519,663 | * 5/1996 | Harper, Jr. et al. .............. | 365/229 |
| 5,524,272 | * 6/1996 | Podowski et al. ............... | 455/3.2 |
| 5,550,738 | 8/1996 | Bailey et al. . | |
| 5,680,328 | 10/1997 | Skorupski et al. . | |
| 5,714,948 | * 2/1998 | Farmakis et al. ............... | 340/961 |
| 5,793,813 | * 8/1998 | Cleave ............................ | 375/259 |
| 5,826,195 | * 10/1998 | Westerlage et al. ............. | 455/456 |
| 5,844,473 | * 12/1998 | Kaman ............................ | 340/439 |
| 5,852,825 | * 12/1998 | Winslow ......................... | 707/6 |
| 5,890,079 | * 3/1999 | Levine ............................ | 701/14 |
| 5,901,142 | * 5/1999 | Averbuch et al. ............... | 370/329 |
| 5,919,239 | * 7/1999 | Fraker et al. ................... | 701/35 |
| 5,926,759 | * 7/1999 | Severwright .................... | 455/431 |
| 6,047,165 | * 4/2000 | Wright et al. ................... | 455/66 |

* cited by examiner

Primary Examiner—William A. Cuchlinski, Jr.
Assistant Examiner—Eric M Gibson
(74) Attorney, Agent, or Firm—Kirkpatrick & Lockhart LLP

(57) ABSTRACT

An aircraft data transmission system used with an aircraft having a data acquisition unit. The system includes a communications unit located in the aircraft and in communication with the data acquisition unit. The system also includes a cellular infrastructure in communication with the data communications unit after the aircraft has landed. The system further includes a data reception unit in communication with the cellular infrastructure.

33 Claims, 10 Drawing Sheets

AIRCRAFT FLIGHT DATA ACQUISITION AND TRANSMISSION SYSTEM

CROSS-REFERENCE TO RELATED APPLICATIONS (Not Applicable)

STATEMENT REGARDING FEDERALLY SPONSORED RESEARCH (Not Applicable)

BACKGROUND OF THE INVENTION

1. Field of the Invention

The present invention is directed generally to an aircraft flight data acquisition and transmission system and, more particularly, to an on-board cellular data transmission system.

2. Description of the Background

It is common for aircraft to generate records of data relating to flight and performance parameters for each flight of the aircraft. The data typically relate to parameters such as air speed, altitude, vertical acceleration, heading, time, etc. The data are utilized in the event of an accident or a near-accident and to assist in maintenance of the aircraft by detecting faulty components or gradual deterioration of a system or component, to assist in reviewing crew performance, and to assist in logistical planning activities such as scheduling and routing.

Aircraft data are typically gathered by a digital flight data acquisition unit (DFDAU). The DFDAU typically stores the data on magnetic or magnetic-optical media. When the aircraft lands, ground personnel board the aircraft, remove the media, and mail the media to a flight operations center (FOC). The manual removal and posting of the data adds a significant labor cost, yields less than desirable data delivery reliability, and results in a significant time delay before the data are useful for analysis.

It is known to use radio frequency (RF) transmissions to transmit data relating to an aircraft. Such teachings, however, require substantial investments to construct the RF transmission systems required for such a system to work. Furthermore, it is very expensive to create redundancy in such a system.

It is also known to transmit data relating to an aircraft via a telephone system located in a terminal. Such a system, however, requires that the aircraft be docked at the gate before transmission begins, thereby resulting in a substantial delay in the transmission. Furthermore, such a system requires an added step of transmitting the data from the aircraft to the terminal telephone system, increasing the cost of installing, operating, and maintaining such a system.

Thus, there is a need for an aircraft data transmission system that automatically transfers flight data from an aircraft to a flight operations center with little or no human involvement and which relies on a reliable wireless delivery system.

SUMMARY OF THE INVENTION

The present invention is directed to an aircraft data transmission system used with an aircraft having a data acquisition unit. The system includes a communications unit located in the aircraft and in communication with the data acquisition unit. The system also includes a cellular infrastructure in communication with the data communications unit after the aircraft has landed. The system further includes a data reception unit in communication with the cellular infrastructure.

The present invention represents a substantial advance over prior aircraft data acquisition and transmission systems. For example, the present invention has the advantage that it requires little expense to implement because it uses well-known technology and the cellular infrastructure which is already in place. The present invention also has the advantage that it can transmit data over multiple parallel channels to achieve the necessary transmission bandwidth and achieve a low data transmission time. The present invention has the further advantage that it does not require a dedicated data link between the aircraft and the flight operations center and/or an airport terminal.

BRIEF DESCRIPTION OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in a typical communications system. It can be recognized that other elements are desirable and/or required to implement a device incorporating the present invention. For example, the details of the cellular communications infrastructure, the Internet, and the public-switched telephone network are not disclosed. However, because such elements are well known in the art, and because they do not facilitate a better understanding of the present invention, a discussion of such elements is not provided herein.

Figure 1:
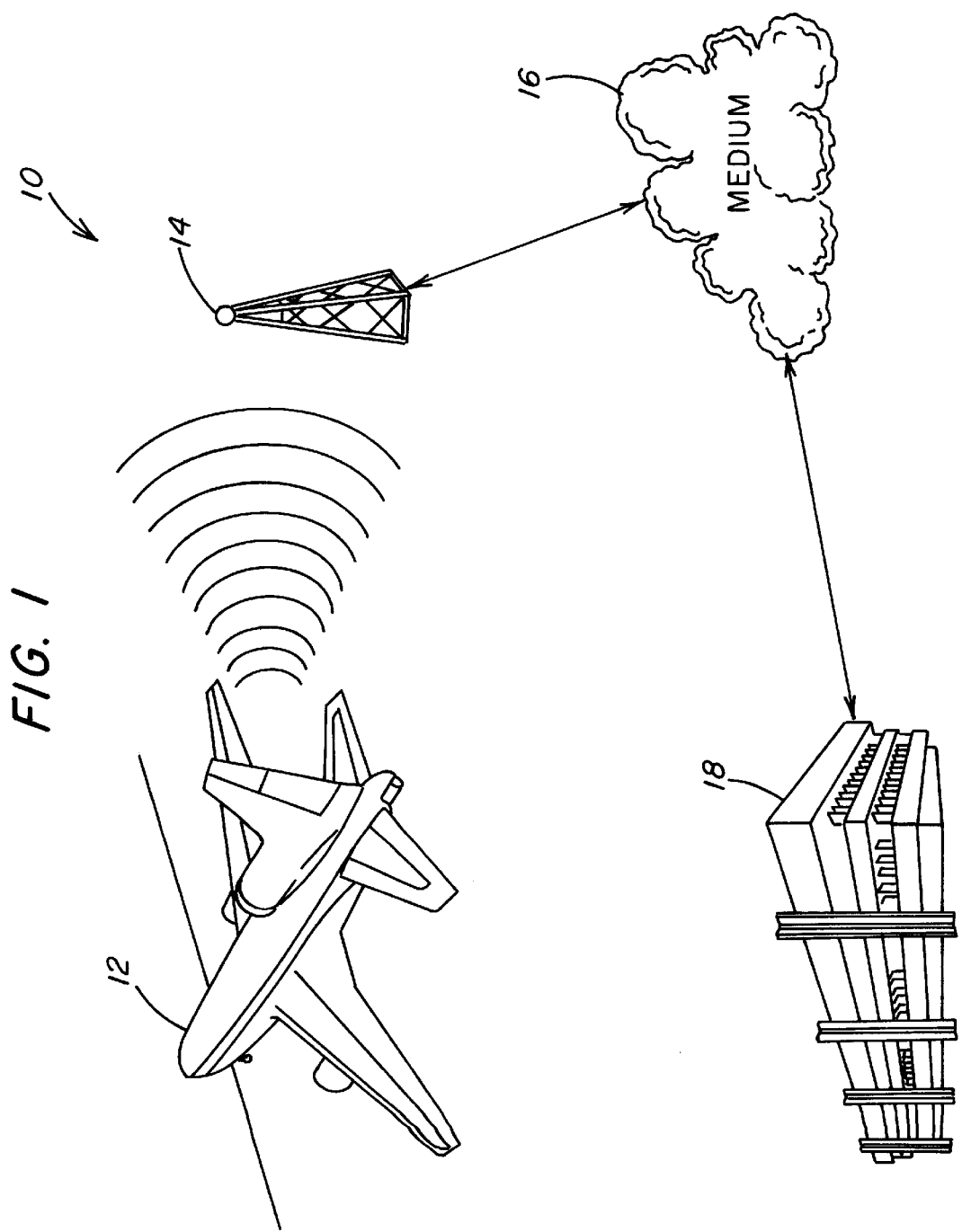
FIG. 1 illustrates an aircraft data acquisition and transmission system.

FIG. 1 illustrates an aircraft data acquisition and transmission system 10. An aircraft 12, which has stored flight data, is illustrated after landing. The aircraft 12 transmits flight data as cellular communications signals to a cellular infrastructure 14. The cellular infrastructure 14 acts as a communications channel to the communications medium 16. A flight operations center 18 is connected to the medium 16 by any conventional connectivity medium such as, for example, a leased line. Once the cellular connections are made via the medium 16 data can flow bidirectionally from or to the aircraft.

Figure 2:
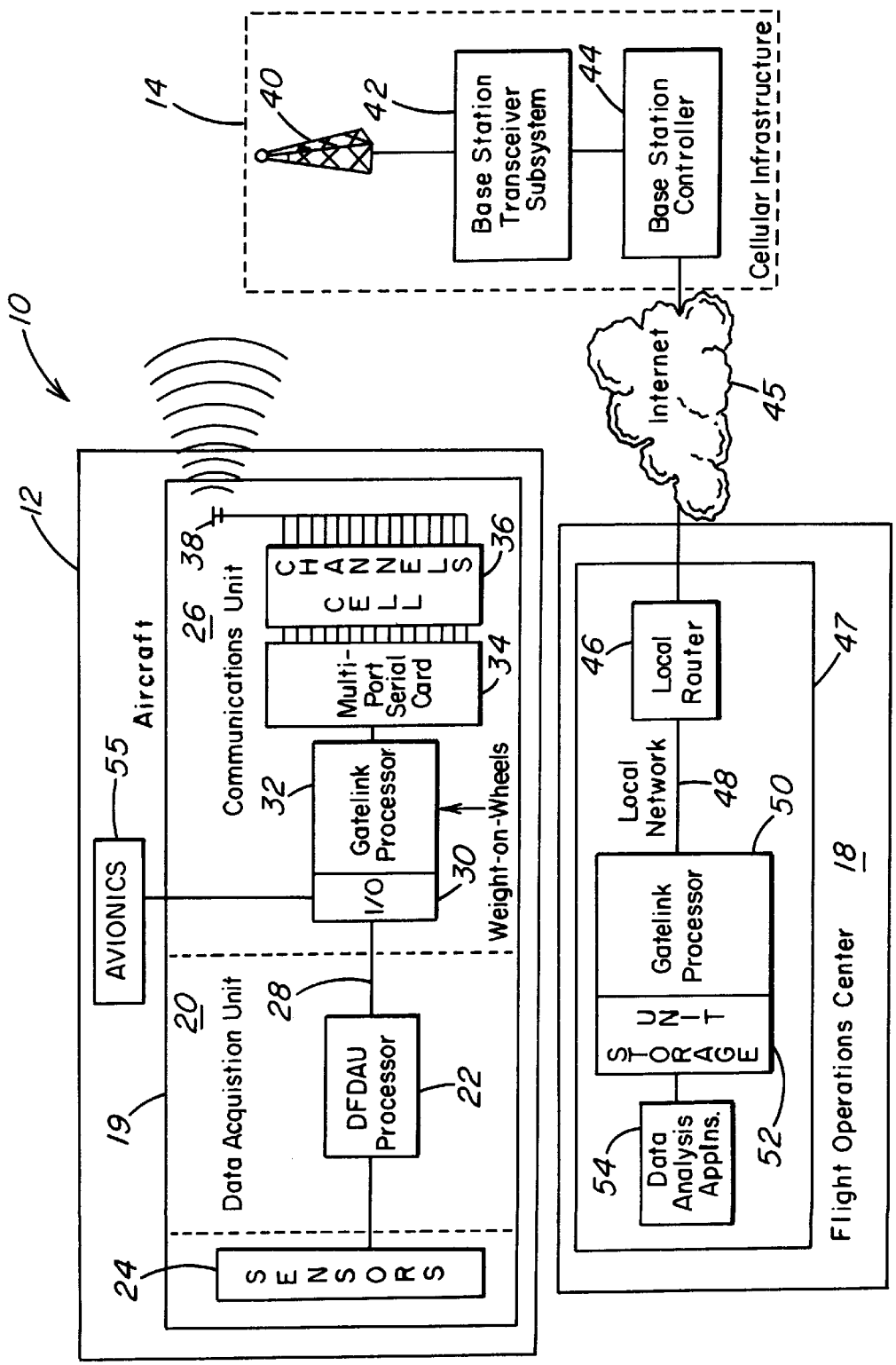
FIG. 2 is a block diagram illustrating a more detailed embodiment of the system illustrated in FIG. 1.

FIG. 2 is a block diagram illustrating a more detailed embodiment of the system 10 illustrated in FIG. 1. The aircraft 12 includes a data system 19 having a data acquisition unit 20. The data acquisition unit 20 includes a digital flight data acquisition unit (DFDAU) processor 22, which includes a storage media for storing flight data in a digital format. The DFDAU processor 22 receives signals from sensors 24 which sense parameters such as air speed, altitude, vertical acceleration, heading, time, etc. The flight data are transferred to a communications unit 26 via a bus 28. The bus 28 is connected to an I/O interface 30 in the communications unit 26. The I/O interface 30 can be a standard bus interface such as, for example, an ARINC 429 bus interface.

The I/O interface 30 is connected to a gatelink processor 32. The processor 32 can be a general purpose processor such as a personal computer, a microprocessor such as an Intel Pentium® processor, or a special purpose processor such as an application specific integrated circuit (ASIC) designed to operate in the system 10. The processor 32 is responsive to a weight-on-wheels signal, which acts as an interrupt signal to signal the processor 32 to initiate transmission or reception of the data when the aircraft 12 has landed. Upon receipt of the weight-on-wheels signal from the landing gear of the aircraft 12, the processor 32 prepares the flight data for transmission and transmits the data to a multi-port serial card 34. Each I/O port of the card 34 is attached to a cell channel which can open, sustain, and close a physical, over-the-air channel to the cellular infrastructure 14. The cell channels 36 can transmit simultaneously and can thus transmit data in parallel. Each cell channel 36 is connected to an antenna matching network and a post amplifier (not shown). An antenna 38 is installed in the aircraft 12 so as to optimize free space radiation to the cellular infrastructure 14.

The data are transmitted over a cellular airlink using the physical layer modulation of the cellular infrastructure 14. The cellular infrastructure 14 includes an antenna 40, which is within free-space radiating range of the aircraft 12. The antenna 40 is connected to a base station transceiver subsystem 42. The subsystem 42 is connected to a base station controller 44 which has a direct connection via a router (not shown) to the Internet 45. The flight data are transmitted via the Internet 45 to the flight operations center 18.

A local router 46 in a data reception unit 47 of the flight operations center 18 is connected to the Internet 45, such as via a connection to the backbone of the Internet 45. The router 46 connects a local area network 48 to the Internet 45. The local area network can be of any type of network such as, for example, a token ring network, an ATM network, or an Ethernet network. A gatelink processor 50 is connected to the network 48 and receives the flight data for storage in an attached storage unit 52. The storage unit 52 can be any type of unit capable of storing data such as, for example, a disk array or a tape drive. The storage unit 52 makes the flight data available to data analysis applications 54 which can analyze and/or report the flight data to a user.

Data transfer can also occur from the flight operations center 18 to the aircraft 12. The data are transmitted via the Internet 45 and the cellular infrastructure 14 and received by the antenna 38. The serial card 34 receives the data from the cell channels 36 and the processor 32 outputs the data, via the I/O interface 30, to avionics 55.

Figure 3:
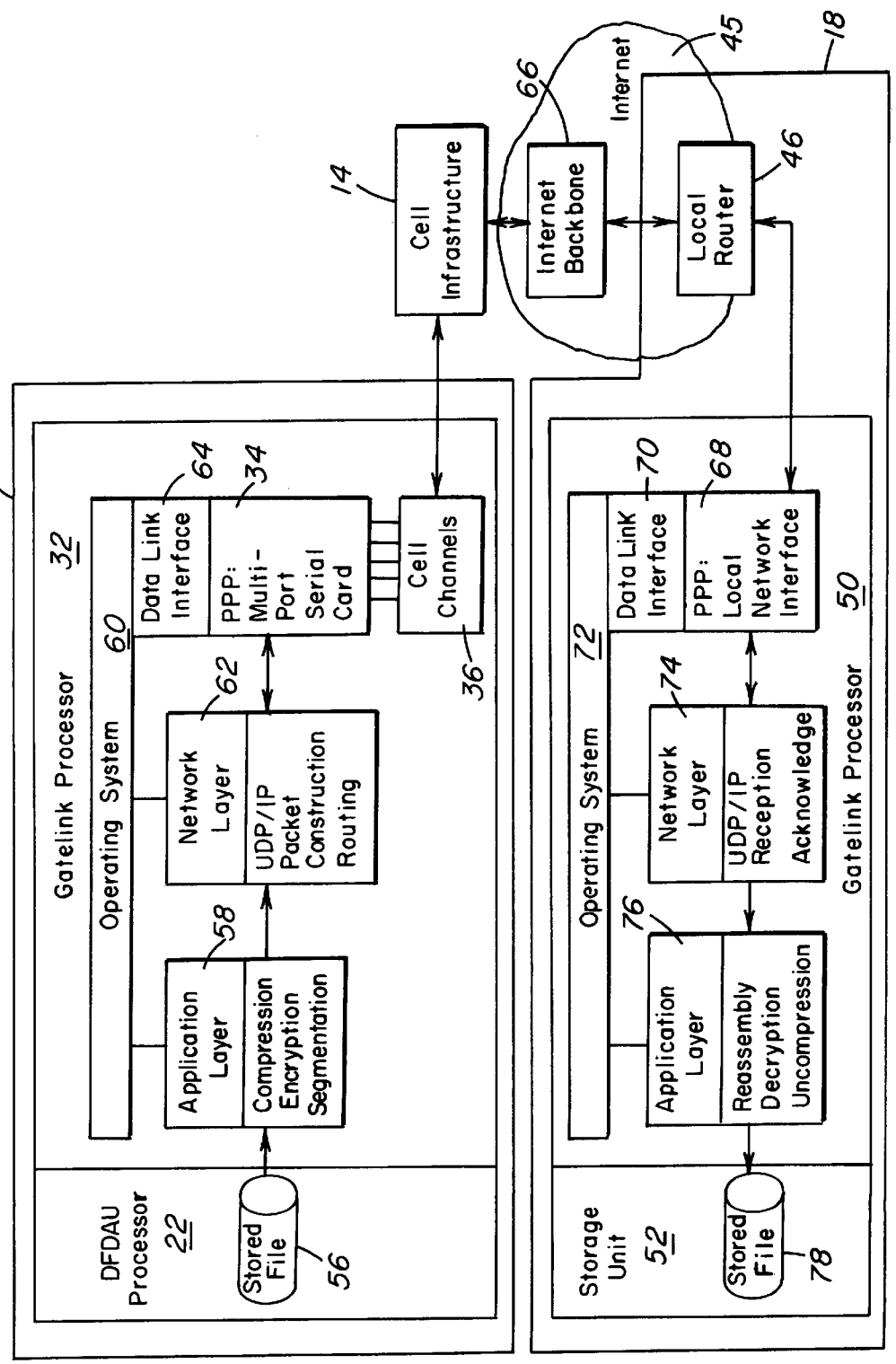
FIG. 3 is a block diagram illustrating data flow through the system illustrated in FIG. 2.

FIG. 3 is a block diagram illustrating data flow through the system 10 illustrated in FIG. 2. The flight data is stored in the DFDAU processor 22 as a stored file 56. An application layer 58 of an operating system 60 of the gatelink processor 32 compresses, encrypts, and segments the data. The operating system 60 can be any type of operating system suitable such as, for example, UNIX. A typical stored file may be compressed from approximately 40 Mbytes to approximately 4 Mbytes. Compression may be done by any compression method such as, for example, the method embodied in the PKZIP® compression utility, manufactured by PKWARE, Inc. Encryption can be accomplished using any suitable asymmetric (public key) or symmetric encryption method such as, for example, the method embodied in Data Encryption Software (DES), manufactured by American Software Engineering or the methods in the RC2, RC4, or RC5 encryption software manufactured by RSA Data Security, Inc. During segmentation individual datagrams of, for example, 1024 bytes are formed and indexed for subsequent reassembly.

The operating system 60 passes the datagrams to a network layer 62 which constructs UDP/IP packets from the datagrams by adding message headers to the datagrams. The network layer 62 then routes the packets to one of up to 16 peer-to-peer protocol (PPP) threads running within the operating system 60 at a data link layer interface 64. The PPP threads convey the packets to the multi-port serial card 34 for transmission to the backbone 66 of the Internet 45 via the cell channels 36 to the cellular infrastructure 14. The packets are received from the Internet 45 by the local router 46 in the flight operations center 18. The network layer 62 receives acknowledgments of received packets from the gatelink processor 50 in the flight operations center 18. The network layer 62 also re-queues packets that are dropped before reaching the gatelink processor 50.

The local router 46 in the flight operations center 18 receives the packets and routes them to the gatelink processor 50. A local network interface 68 receives the packets and a data link layer interface 70 of an operating system 72 passes the packets to a network layer 74 of the operating system 72. The operating system 72 can be any type of suitable operating system such as, for example, UNIX. The network layer 74 sends acknowledgments of successful packet deliveries to the gatelink processor 32. The network layer 74 also removes the UDP/IP headers and passes the datagrams to an application layer 76. The application layer 76 reassembles, decrypts, and uncompresses the datagrams to restore the flight data to its original form. The application layer then passes the data to a stored file 78 in the storage unit 52. The functions performed by the aircraft 12 and the flight operations center 18 are similarly interchangeable when data is transferred from the flight operations center 18 to the aircraft 12.

Figure 4:
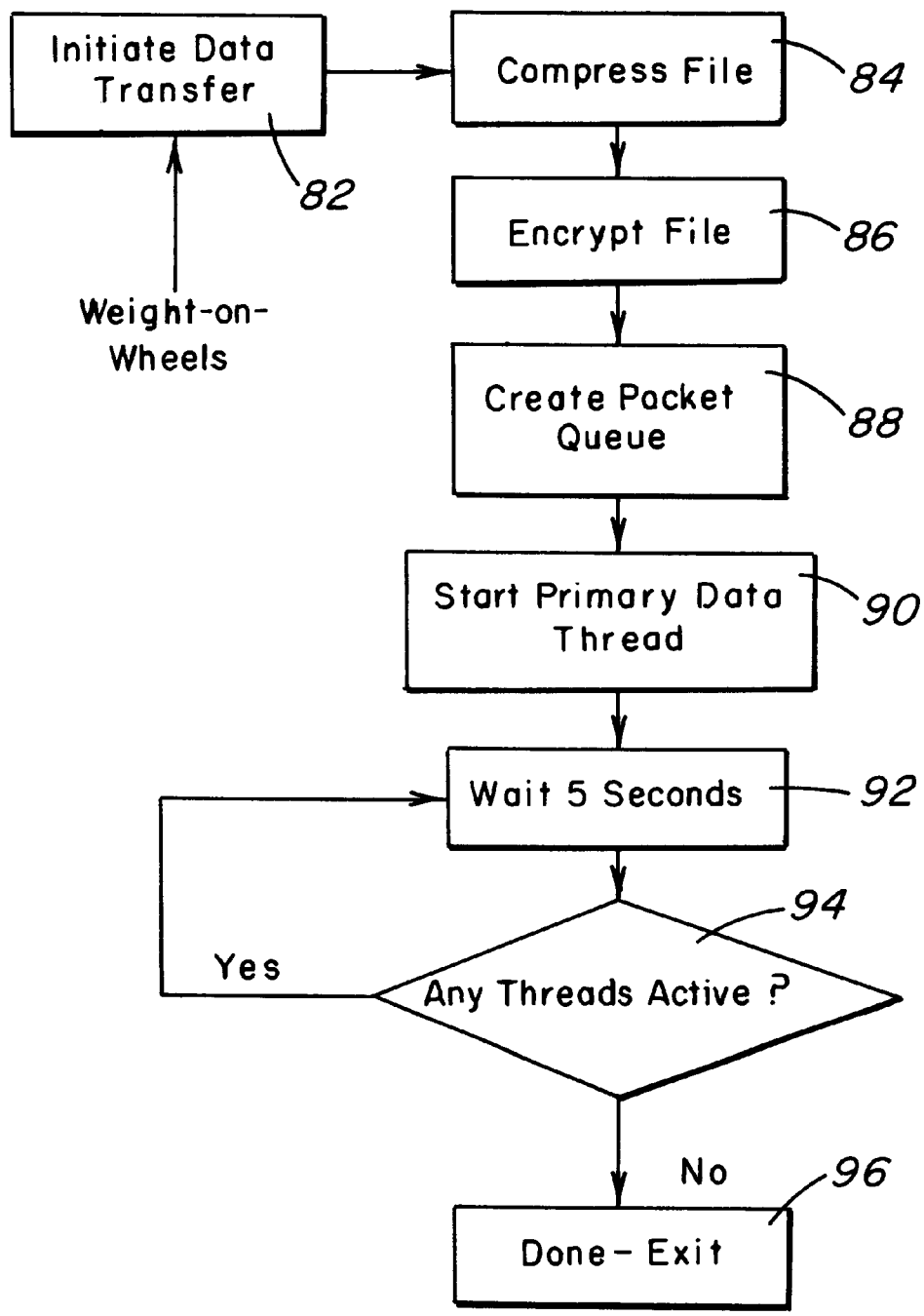
FIG. 4 is a flowchart illustrating a method carried out by the gatelink processor in the aircraft.

FIG. 4 is a flowchart illustrating a method carried out by the gatelink processor 32 in the aircraft. At step 82, the gatelink processor 32 receives a weight-on-wheels interrupt which signals that the aircraft has landed, and the data transfer is initiated. The application layer 58 compresses the flight data at step 84 and encrypts the data at step 86. At step 88, the data is segmented into datagrams and UDP/IP packets are constructed. The packets are then placed in a packet queue. The packets are then ready for transmission as a fixed number of threads, corresponding to the number of cell channels 36. At step 90, the primary data thread is started to make the initial call and open the communications channel to the flight operations center 18. A wait state at step 92 is invoked for a predetermined period of time (5 sec.) and at step 94, the processor 32 determines if any threads are active, i.e. if there are any packets that haven't been transmitted or have been transmitted and dropped. If there are no packets remaining, the method is completed at step 96. If there are packets remaining, the method enters the wait state at step 92 and subsequently determines if any threads are active at step 94.

Figure 5:
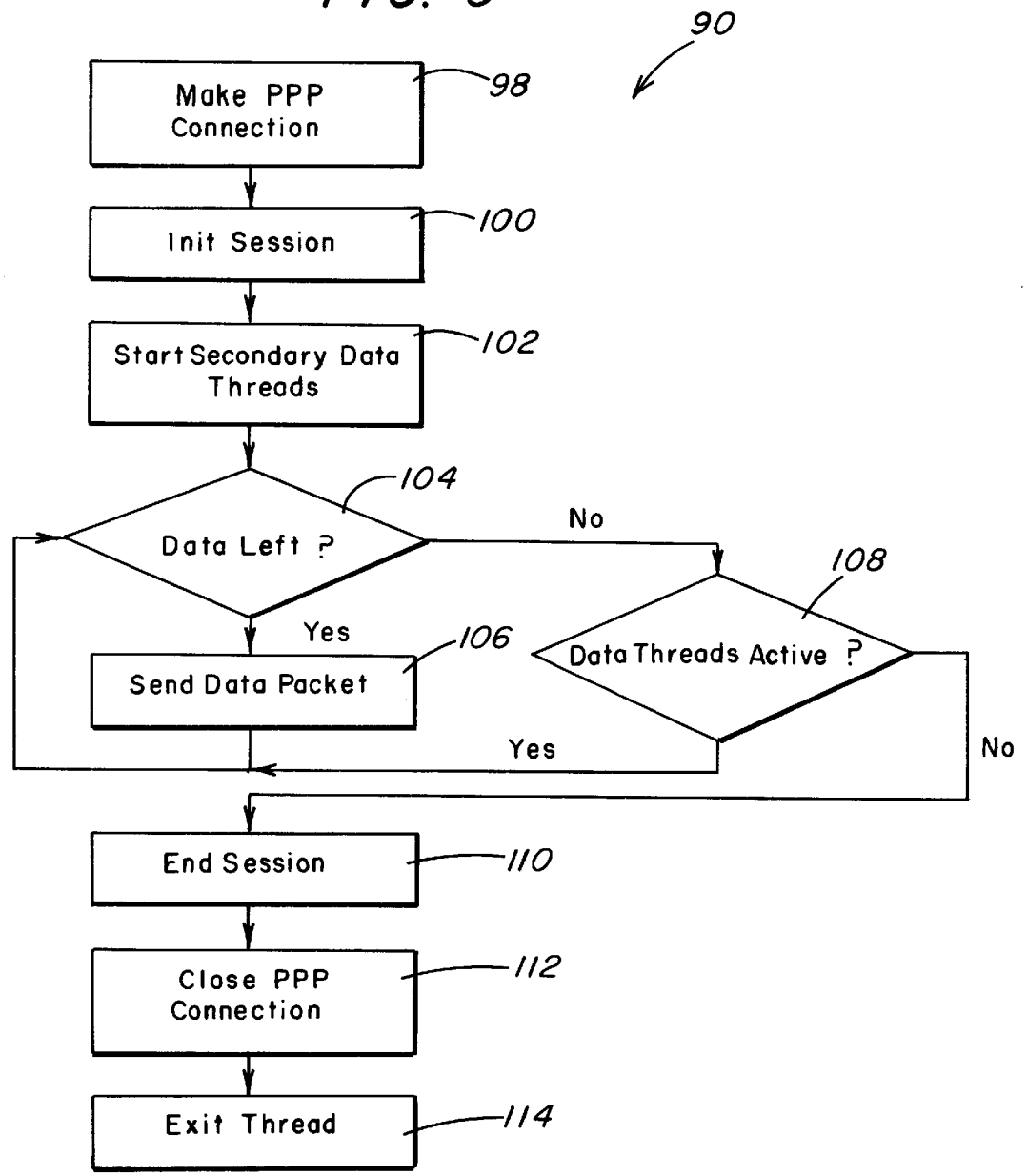
FIG. 5 is a flowchart illustrating a method of performing the start primary data thread step of FIG. 4.

FIG. 5 is a flowchart illustrating a method of performing the start primary data thread step 90 of FIG. 4. At step 98, the point-to-point protocol (PPP) connection is initiated for the primary data thread through one of the cell channels 36 and the gatelink session is initiated at step 100. The secondary data thread transmissions are started at step 102. At step 104, it is determined if any packets are left in the primary data thread to be transmitted. If so, the next packet in the primary data thread is transmitted at step 106. If no packets are left to transmit in the primary data thread as determined at step 104, it is determined if any of the secondary data threads are active at step 108. If so, the process returns to step 104 and repeats step 108 until no threads are active. If no threads are active, the gatelink session is ended at step 110 and the PPP connection for the primary data thread is closed at step 112. At step 114, the primary data thread step 90 is completed.

Figure 6:
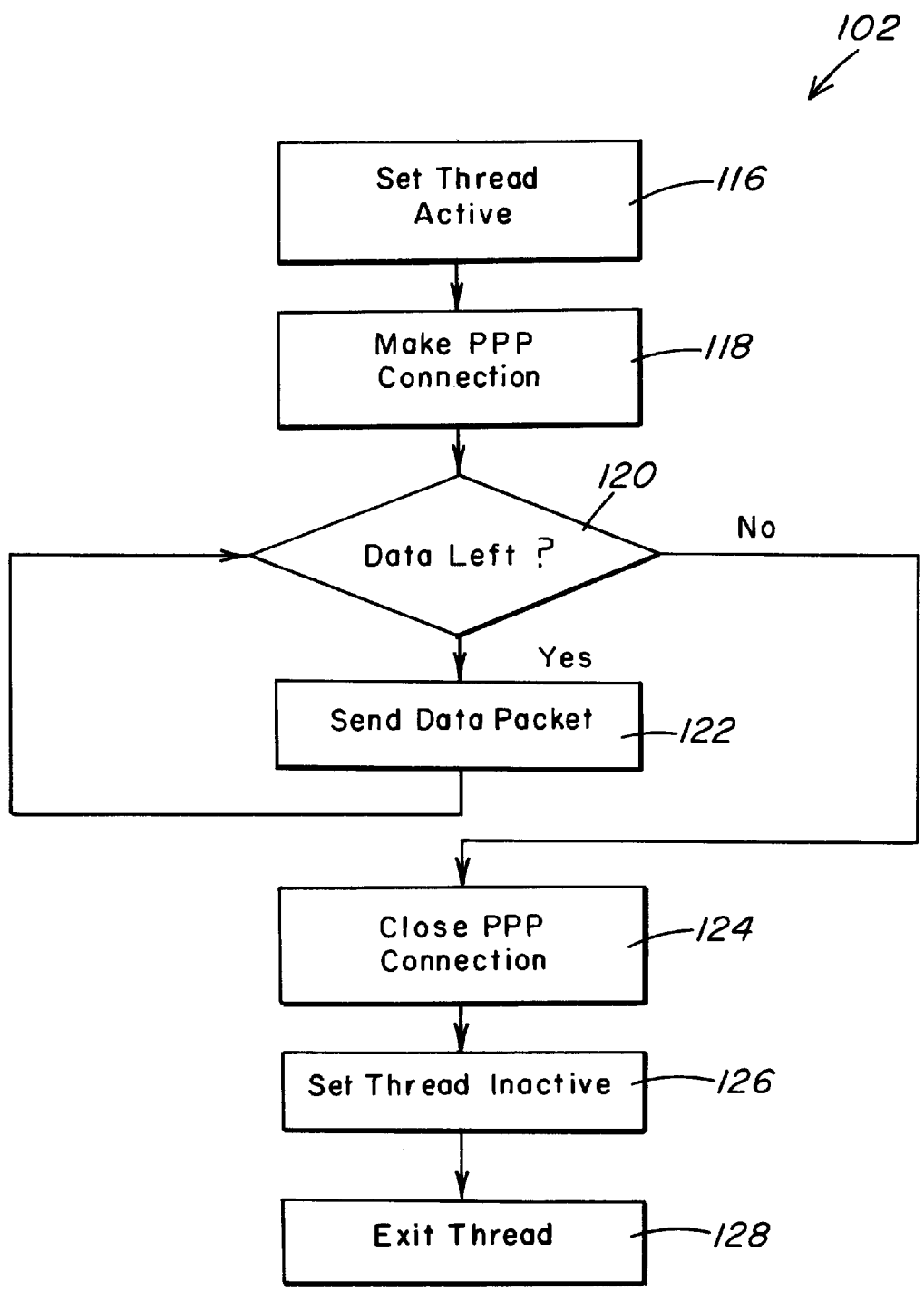
FIG. 6 is a flowchart illustrating a method of performing the start secondary data threads step of FIG. 5.

FIG. 6 is a flowchart illustrating a method of performing the start secondary data threads step 102 of FIG. 5. The method is carried out in parallel for each secondary data thread. At step 116, the thread is set to active so that the processor 32 can determine if any threads are active at step 108 of FIG. 5. The PPP connection for the secondary data thread being transmitted is initiated at step 118. At step 120, it is determined if any packets remain in the data thread. If so, the packet is transmitted at step 122. If no packets remain in the data thread, the PPP connection is closed at step 124 and the thread is set to inactive at step 126. The method is completed at step 128.

Figure 7:
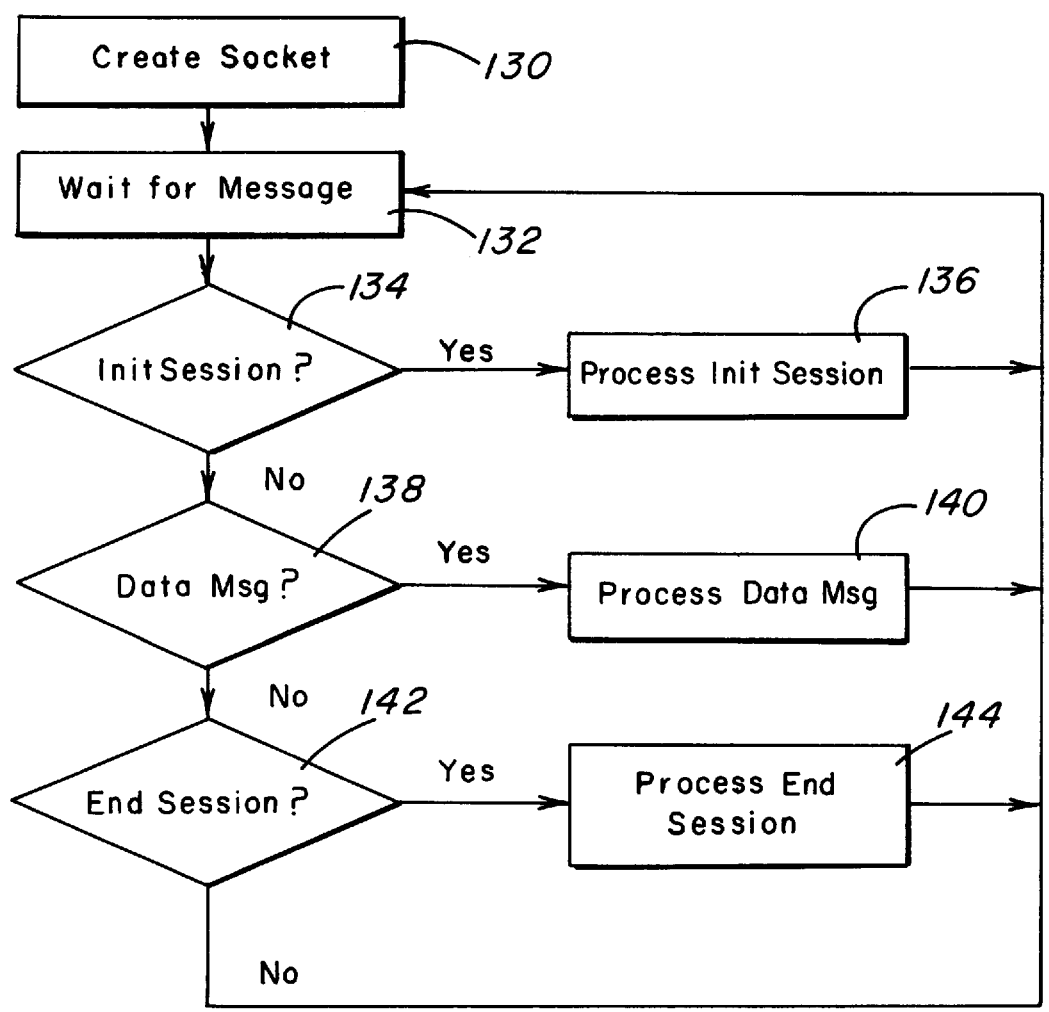
FIG. 7 is a flowchart illustrating a method of operating the gatelink processor in the flight operations center.

FIG. 7 is a flowchart illustrating a method of operating the gatelink processor 50 in the flight operations center 18. At step 130, a socket is opened to allow the operating system 72 in the processor 50 to receive and transport messages across the Internet 45. At step 132, the processor 50 waits for a message from the Internet 16. When a message is received, the processor 50 determines if the message is a session initiatialization message at step 134. If the message is a session initialization message, the processor 50 executes the session initiatialization process at step 136. If the message is not a session initiatialization message at step 134, the processor 50 determines if the message is a data message at step 138. If the message is a data message, the processor 50 executes the data message process at step 140. If the message is not a data message, the processor 50 determines if the message is an end session message at step 142. If the message is an end session message, the processor 50 executes the end session process at step 144 and then returns to step 132 to wait for additional messages..

Figure 8:
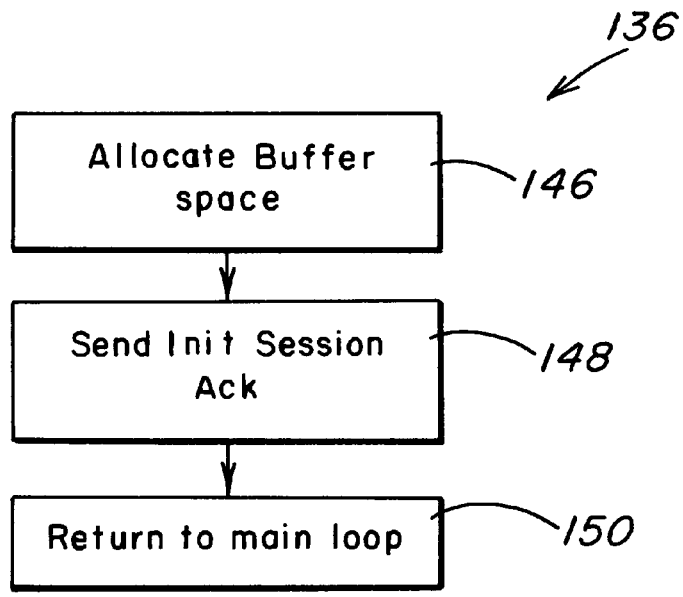
FIG. 8 is a flowchart illustrating a method of performing the initialize session process step of FIG. 7.

FIG. 8 is a flowchart illustrating a method of performing the initialize session process step 136 of FIG. 7. The processor 50 allocates buffer space for subsequent data reception at step 146. The processor 50 then sends a session initialized data acknowledgment to the processor 32 at step 148. At step 150, the flow returns to step 132 of FIG. 7.

Figure 9:
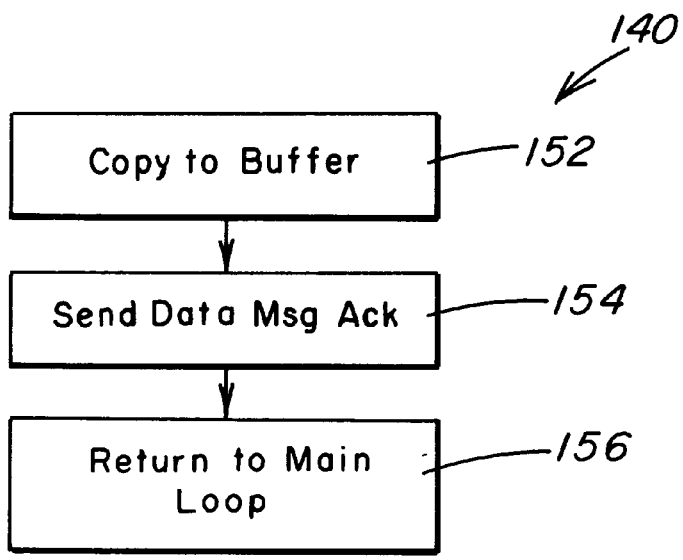
FIG. 9 is a flowchart illustrating a method of performing the data message process step of FIG. 7.

FIG. 9 is a flowchart illustrating a method of performing the data message process step 140 of FIG. 7. At step 152, the received data message is copied to a buffer and an acknowledgment of the data received is sent at step 154. At step 156, the flow returns to step 132 of FIG. 7.

Figure 10:
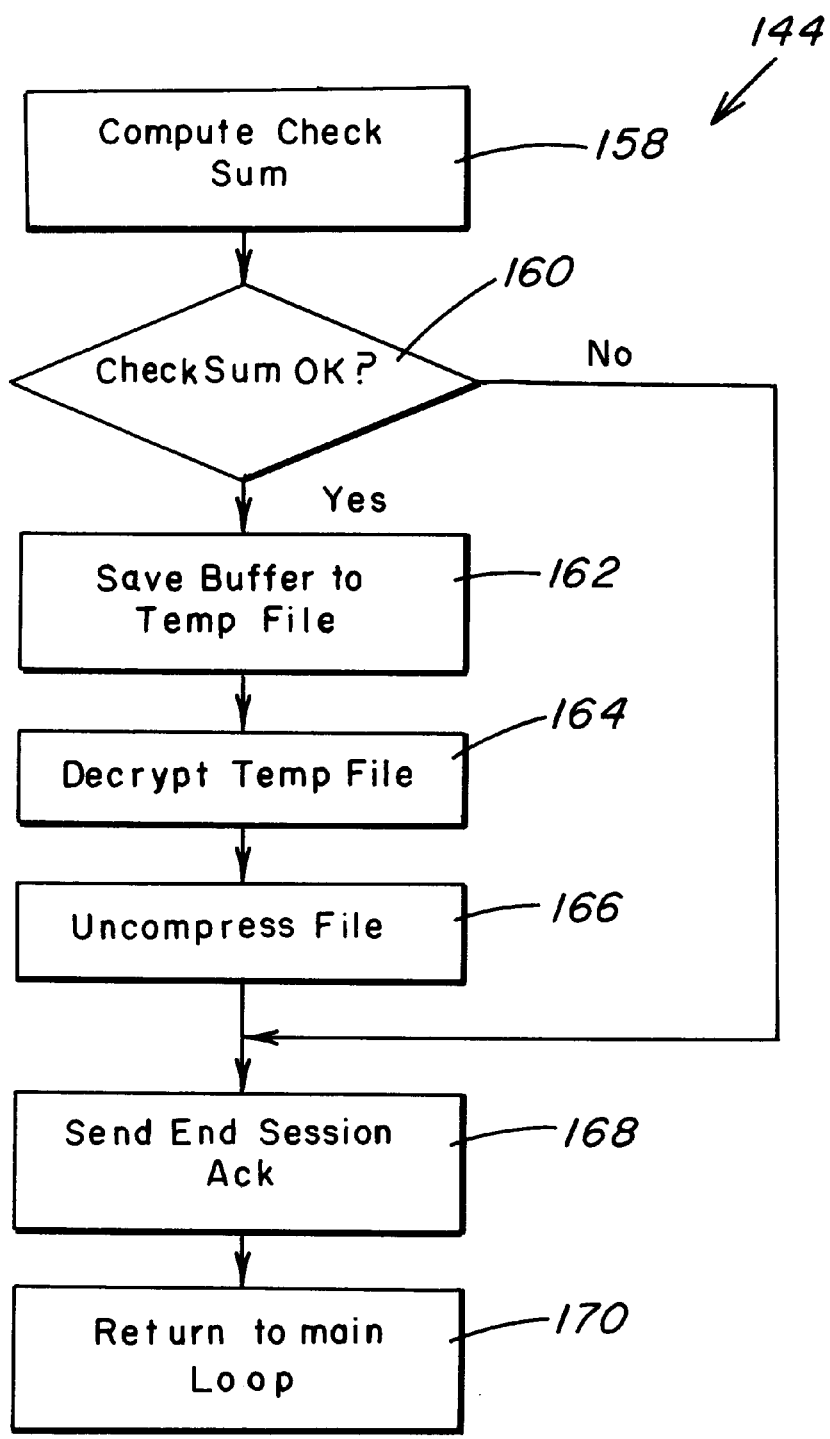
FIG. 10 is a flowchart illustrating a method of performing the end session process step of FIG. 7.

FIG. 10 is a flowchart illustrating the steps included in the end session process step 144 of FIG. 7. At step 158, the checksum is computed for the received data to check the integrity of the data. The checksum is checked at step 160 and, if it is correct, the processor 50 saves the buffer to a temporary file at step 162. The processor 50 then decrypts the file at step 164 and uncompresses the file at step 166. The processor 50 sends an end session acknowledge message to the processor 32 at step 168 and at step 170, the flow returns to step 132 of FIG. 7. If the checksum is not correct, the processor 50 sends an unsuccessful end session message, which notifies the processor 32 to resend the data.

Figure 11:
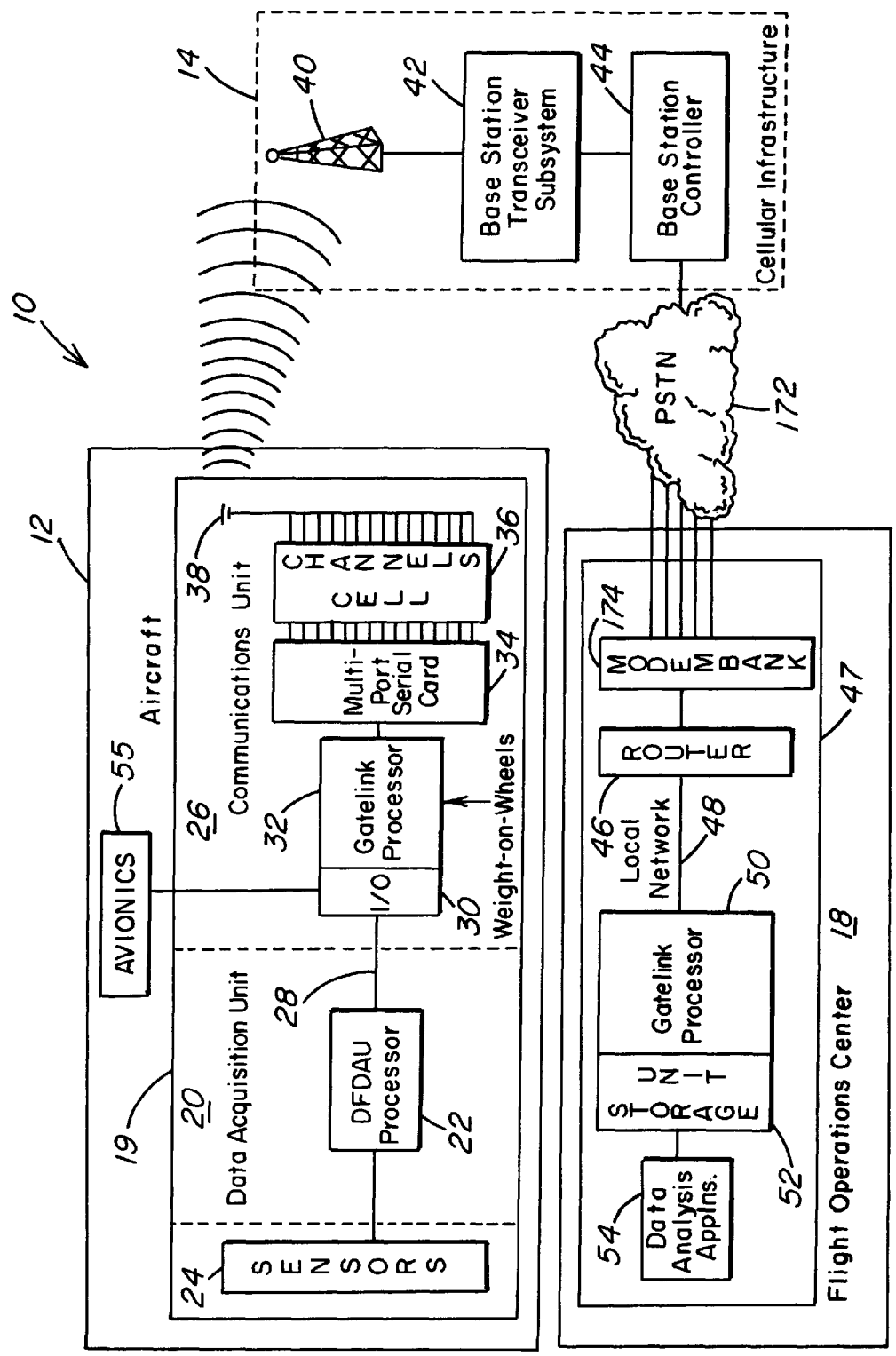
FIG. 11 is a block diagram illustrating another embodiment of the system illustrated in FIG. 1.

FIG. 11 is a block diagram illustrating another embodiment of the system 10 illustrated in FIG. 1. The operation of the system 10 of FIG. 11 is similar to that described in conjunction with the system 10 of FIG. 2. However, the flight data is transmitted from the cellular infrastructure 14 to the flight operations center 18 via the public-switched telephone network 172. A modem bank 174 receives the data via the PSTN 172. The data is then routed by the router 46 to the processor 50 via the network 48. The modem bank 174 can have a modem dedicated to receive data transmitted by one of the cell channels 36.

While the present invention has been described in conjunction with preferred embodiments thereof, many modifications and variations will be apparent to those of ordinary skill in the art. For example, although the system has been described hereinabove as transferring data from the aircraft, the system can also be used to transfer data to the aircraft with no modifications in the system. Also, the system may be used to transmit data while the aircraft is in flight. Furthermore, the system may be used without encryption and without data compression prior to sending data. The foregoing description and the following claims are intended to cover all such modifications and variations.

What is claimed is:

1. An aircraft data transmission system, the aircraft having a data acquisition unit, comprising:
    a communications unit located in the aircraft and in communication with the data acquisition unit;
    a cellular infrastructure in communication with said communications unit after the aircraft has landed, wherein the communication is initiated automatically upon landing of the aircraft; and
    a data reception unit in communication with said cellular infrastructure.

2. The system of claim 1 wherein said data reception unit is in communication with said cellular infrastructure via the Internet.

3. The system of claim 1 wherein said data reception unit is in communication with said cellular infrastructure via the public switch telephone network.

4. The system of claim 1 wherein said communications unit has at least one modem in communication with said cellular infrastructure and said data reception unit has at least one modem in communication with said cellular infrastructure.

5. The system of claim 1 wherein said communications unit includes:
    a processor;
    a serial card in communication with said processor;
    at least one cell channel in communication with said serial card; and at least one antenna in communication with said cell channel.

6. The system of claim 1 wherein said cellular infrastructure includes:
   an antenna;
   a transceiver subsystem in communication with said antenna; and
   a controller in communication with said transceiver subsystem.

7. The system of claim 1 wherein said data reception unit includes:
   a router; and
   a processor in communication with said router, said processor having a storage unit.

8. A data system for an aircraft, comprising:
   a digital flight data acquisition unit in communication with at least one sensor;
   a processor in communication with said digital flight data acquisition unit;
   a serial card in communication with said processor; and
   a plurality of cell channels in communication with said serial card, said cell channels for transmitting data via a cellular infrastructure after the aircraft has landed, wherein the communication between the cell channels and the serial card is initiated automatically upon landing of the aircraft.

9. The system of claim 8 further comprising an antenna in communication with said cell channels.

10. The system of claim 8 wherein said processor includes a personal computer.

11. The system of claim 8 wherein said processor includes an ASIC.

12. The system of claim 8 wherein said processor includes a microprocessor.

13. The system of claim 8 wherein said processor has an I/O interface in communication with said digital flight data acquisition unit.

14. An aircraft, comprising:
   a digital flight data acquisition unit in communication with at least one sensor; and
   a communications unit in communication with said digital flight data acquisition unit, said communications unit including:
      a processor in communication with said digital flight data acquisition unit;
      a serial card in communication with said processor; and
      a plurality of cell channels in communication with said serial card, said cell channels for transmitting data via a cellular infrastructure after the aircraft has landed, wherein the communication between the cell channels and the serial card is initiated automatically upon landing of the aircraft.

15. An aircraft data transmission system, the aircraft having a data acquisition unit, comprising:
   means for transmitting data from the data acquisition unit via a cellular infrastructure after the aircraft has landed, wherein transmission of the data is initiated automatically upon landing of the aircraft; and
   means for receiving said data from said cellular infrastructure.

16. The system of claim 15 wherein said means for transmitting data includes a processor.

17. The system of claim 15 wherein said means for receiving data includes a processor.

18. A method of transmitting aircraft flight data from an aircraft, comprising:
   receiving flight data from a data acquisition unit;
   transmitting said flight data via a cellular communications infrastructure after the aircraft has landed, wherein the cellular communications infrastructure is accessed automatically upon landing of the aircraft; and
   receiving said transmitted flight data.

19. A computer-implemented method of transmitting aircraft flight data from an aircraft, comprising:
   receiving flight data from a digital flight data acquisition unit;
   processing said flight data to prepare said data for transmission; and
   transmitting said processed data via a cellular infrastructure after the aircraft has landed, wherein the cellular infrastructure is accessed automatically upon landing of the aircraft.

20. The method of claim 19 further comprising receiving said transmitted data at a flight operations center.

21. The method of claim 20 further comprising receiving said transmitted data and transmitting said received data via the Internet before receiving said transmitted data at a flight operations center.

22. The method of claim 20 further comprising receiving said transmitted data and transmitting said received data via the public-switched telephone network before receiving said transmitted data at a flight operations center.

23. The method of claim 19 wherein processing said flight data includes:
   compressing said flight data;
   encrypting said flight data;
   segmenting said flight data; and
   constructing packets of data from said segmented flight data.

24. The method of claim 19 wherein receiving said transmitted data includes:
   acknowledging receipt of said transmitted data;
   reassembling said received data;
   decrypting said reassembled data;
   uncompressing said decrypted data; and
   storing said uncompressed data.

25. A computer-implemented method of transmitting aircraft flight data from an aircraft, comprising:
   receiving flight data from a digital flight data acquisition unit;
   processing said flight data to prepare said data for transmission; and
   transmitting said processed data via a cellular infrastructure after the aircraft has landed, wherein processing said flight data includes:
      receiving a weight-on-wheels signal;
      initiating a data transfer;
      compressing said flight data;
      encrypting said compressed data;
      creating a packet queue;
      starting a primary data thread;
      waiting a predetermined period of time;
      determining if any threads are active;
      repeating, when threads are active, the steps of waiting a predetermined period of time and determining if any threads are active; and
      exiting processing said flight data when no threads are active.

26. The method of claim 25 wherein starting a primary data thread includes:
- initiating a PPP connection;
- initiating a transfer session;
- starting at least one secondary data thread;
- determining if data remains in the primary data thread;
- sending said data when data remains in the primary data thread;
- determining if data threads are active when no data remains in the primary data thread;
- repeating, when said threads are active, the step of determining if data remains in the primary data thread;
- ending said session when no threads are active;
- closing said PPP connection; and
- exiting starting a primary data thread.

27. The method of claim 26 wherein starting at least one secondary data thread includes:
- (a) setting the secondary data thread to active;
- (b) initiating a PPP connection;
- (c) determining if data remains in the secondary data thread;
- (d) sending a data packet when data remains;
- (e) repeating step c when data remains;
- (f) closing said PPP connection when no data remains;
- (g) setting the secondary data thread to inactive;
- (h) exiting starting at least one secondary data thread; and
- (i) repeating steps a through h for each secondary data thread.

28. The method of claim 27 wherein repeating steps a through h includes repeating steps a through h in parallel for each said secondary data thread.

29. A computer-implemented method of transmitting aircraft flight data from an aircraft, comprising:
- receiving flight data from a digital flight data acquisition unit;
- processing said flight data to prepare said data for transmission; and
- transmitting said processed data via a cellular infrastructure after the aircraft has landed; and
- receiving said transmitted data at a flight operations center, wherein receiving said transmitted data includes:
  - creating a socket;
  - receiving a message;
  - determining if said message is an initialization message;
  - initiating a session when said message is an initialization message;
  - determining if said message is a data message when said message is not an initialization message;
  - processing said message when said message is a data message;
  - determining if said message is an end session when said message is not a data message;
  - processing said message when said message is an end session; and
  - repeating, when said message is not an end session message, the step of receiving a message.

30. The method of claim 29 wherein initializing a session includes:
- allocating buffer space;
- sending an initiation session acknowledgment; and
- returning to receiving a message.

31. The method of claim 29 wherein processing said message when said message is a data message includes:
- copying said message to a buffer;
- sending a data message acknowledgment; and
- returning to receiving a message.

32. The method of claim 29 wherein processing said message when said message is not an end session includes:
- computing a checksum;
- determining if said checksum is valid;
- saving a buffer to a temporary file;
- decrypting said temporary file;
- uncompressing said temporary file;
- sending an end session acknowledgment; and
- returning to receiving a message.

33. A computer readable medium having stored thereon instructions which when executed by a processor, cause the processor to perform the steps of:
- receiving flight data from a digital flight data acquisition unit in an aircraft;
- processing said flight data to prepare said data for transmission; and
- transmitting said processed data via a cellular infrastructure when said aircraft has landed, wherein the cellular infrastructure is accessed automatically upon landing of the aircraft.

* * * * *

US006181990C1

(12) EX PARTE REEXAMINATION CERTIFICATE (5393rd)
United States Patent
Grabowsky et al.

(10) Number: US 6,181,990 C1
(45) Certificate Issued: Jun. 6, 2006

(54) AIRCRAFT FLIGHT DATA ACQUISITION AND TRANSMISSION SYSTEM

(75) Inventors: John Francis Grabowsky, Camarillo, CA (US); David Ray Stevens, Simi Valley, CA (US)

(73) Assignee: Teledyne Technologies Incorporated, Los Angeles, CA (US)

Reexamination Request:
No. 90/006,742, Aug. 12, 2003

Reexamination Certificate for:
Patent No.: 6,181,990
Issued: Jan. 30, 2001
Appl. No.: 09/126,156
Filed: Jul. 30, 1998

(51) Int. Cl.
*H04B 7/00* (2006.01)
*G06F 13/00* (2006.01)

(52) U.S. Cl. ............................. 701/14; 701/35; 701/16; 455/431; 342/33; 73/178 T

(58) Field of Classification Search ...................... 701/3, 701/14, 16; 340/945, 947, 948, 951, 960; 73/178 T; 342/33
See application file for complete search history.

(56) References Cited

U.S. PATENT DOCUMENTS

| | | |
|---|---|---|
| 4,642,775 A | 2/1987 | Cline et al. |
| 4,872,182 A | 10/1989 | McRae et al. |
| 4,939,652 A | 7/1990 | Steiner |
| 5,351,194 A | 9/1994 | Ross et al. ................ 364/449 |
| 5,359,446 A | 10/1994 | Johnson et al. |
| 5,445,347 A | 8/1995 | Ng |
| 5,463,656 A | 10/1995 | Polivka et al. ............... 375/200 |
| 5,652,717 A | 7/1997 | Miller et al. ................. 364/578 |
| 5,761,625 A | 6/1998 | Honcik et al. |
| 5,943,399 A | 8/1999 | Bannister et al. ......... 379/88.17 |
| 6,047,165 A | 4/2000 | Wright et al. .................. 455/66 |
| 6,104,914 A | 8/2000 | Wright et al. .................. 455/66 |
| 6,108,523 A | 8/2000 | Wright et al. .................. 455/66 |
| 6,154,637 A | 11/2000 | Wright et al. .................. 455/66 |
| 6,308,045 B1 | 10/2001 | Wright et al. .................. 455/66 |

FOREIGN PATENT DOCUMENTS

| | | |
|---|---|---|
| EP | 0 407 179 A1 | 1/1991 |
| EP | 0 774 274 B1 | 5/1997 |
| EP | 0 408 094 B1 | 7/1997 |
| GB | 2 276 006 A | 9/1994 |

OTHER PUBLICATIONS

Airlines Electronic Engineering Committee, ARINC Characteristic 751, "Gate–Aircraft Terminal Environment Link (Gatelink)–Aircraft Side", Published Jan. 1, 1994.
Airlines Electronic Engineering Committee, Specification 632, "Gate–Aircraft Terminal Environment Link (Gatelink)–Ground Side", Published Dec. 30, 1994.

*Primary Examiner*—Y. Beaulieu

(57) ABSTRACT

An aircraft data transmission system used with an aircraft having a data acquisition unit. The system includes a communications unit located in the aircraft and in communication with the data acquisition unit. The system also includes a cellular infrastructure in communication with the data communications unit after the aircraft has landed. The system further includes a data reception unit in communication with the cellular infrastructure.

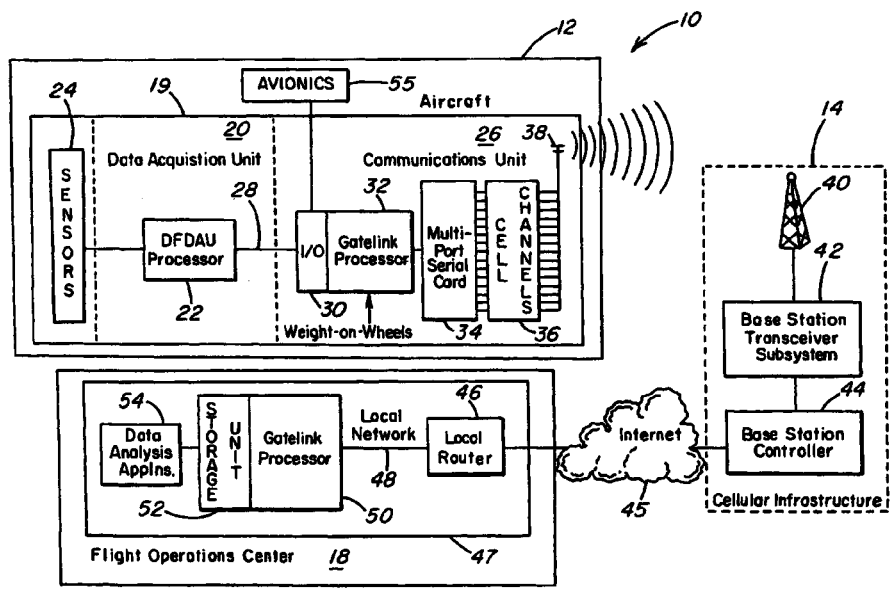

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8–14 and 25–32 is confirmed.

Claims 1, 15, 18, 19 and 33 are determined to be patentable as amended.

Claims 2–7, 16, 17 and 20–24, dependent on an amended claim, are determined to be patentable.

New claims 34–51 are added and determined to be patentable.

1. An aircraft data transmission system, the aircraft having a data acquisition unit, *and the aircraft including a data storage medium having stored thereon flight data gathered in-flight by at least a first sensor on the aircraft*, comprising:
   a communications unit located in the aircraft and in communication with the data acquisition unit;
   *at least a second sensor configured to sense a landing of the aircraft;*
   a cellular infrastructure in communication with said communications unit after the aircraft has landed, *wherein the cellular infrastructure communicates said flight data, and* wherein the communication is initiated [automatically upon] *when at least the second sensor senses the* landing of the aircraft; [and]
   a data reception unit in communication with said cellular infrastructure; *and*
   *wherein said flight data includes time, airspeed, altitude, vertical acceleration, and heading data relating to a flight of the aircraft.*

15. An aircraft data transmission system, the aircraft having a data acquisition unit, *the aircraft including a data storage medium having stored thereon flight data gathered in-flight by at least one sensor on the aircraft*, comprising:
    *sensing means for sensing a landing of the aircraft;*
    means for transmitting *said flight* data from the data acquisition unit, via a cellular infrastructure after the aircraft has landed, wherein transmission of the data is initiated [automatically upon] *when the sensing means sense the* landing of the aircraft; [and]
    means for receiving said *flight* data from said cellular infrastructure; *and*
    *wherein said flight data includes time, airspeed, altitude, vertical acceleration, and heading data relating to a flight of the aircraft.*

18. A method of transmitting aircraft flight data from an aircraft, comprising:
    receiving flight data from a data acquisition unit;
    *receiving a signal indicating a landing of the aircraft from at least a first sensor;*
    transmitting said flight data via a cellular communications infrastructure after the aircraft has landed, wherein the cellular communications infrastructure is accessed [automatically upon landing of the aircraft] *in response to the signal*; [and]
    receiving said transmitted flight data; *and*
    *wherein said flight data is gathered in-flight by at least a second sensor on the aircraft, and includes time, airspeed, altitude, vertical acceleration, and heading data relating to a flight of the aircraft.*

19. A computer-implemented method of transmitting aircraft flight data from an aircraft, comprising:
    receiving flight data from a digital flight data acquisition unit, *wherein said flight data is gathered in-flight by at least a first sensor on the aircraft, and includes time, airspeed, altitude, vertical acceleration, and heading data relating to a flight of the aircraft*;
    *receiving a signal indicating a landing of the aircraft from at least a second sensor;*
    processing said flight data to prepare said data for transmission; and
    transmitting said processed data via a cellular infrastructure after the aircraft has landed, wherein the cellular infrastructure is accessed [automatically upon landing of the aircraft] *in response to the signal*.

33. A computer readable medium having stored thereon instructions which when executed by a processor, cause the processor to perform the steps of:
    receiving flight data from a digital flight data acquisition unit in an aircraft, *wherein said flight data is gathered in-flight by at least a first sensor on the aircraft, and includes time, airspeed, altitude, vertical acceleration, and heading data relating to a flight of the aircraft;*
    *receiving a signal indicating a landing of the aircraft from at least a second sensor;*
    processing said flight data to prepare said data for transmission; and
    transmitting said processed data via a cellular infrastructure when said aircraft has landed, wherein the cellular infrastructure is accessed [automatically upon landing of the aircraft] *in response to the signal*.

*34. The system of claim 1, wherein the cellular infrastructure is a cellular telephone infrastructure.*

*35. The system of claim 34, wherein said data reception unit is in communication with said cellular infrastructure via the Internet.*

*36. The system of claim 34, wherein said data reception unit is in communication with said cellular infrastructure via the public switch telephone network.*

*37. The system of claim 34, wherein said data communications unit has at least one modem in communication with said cellular infrastructure and said data reception unit has at least one modem in communication with said cellular infrastructure.*

*38. The system of claim 34, wherein said communications unit includes:*
   *a processor;*
   *a serial card in communication with said processor;*
   *at least one cell channel in communication with said serial card; and*
   *at least one antenna in communication with said cell channel.*

*39. The system of claim 34, wherein said cellular infrastructure includes:*
   *an antenna;* a transceiver subsystem in communication with said antenna; and a controller in communication with said transceiver subsystem.

40. The system of claim 34, wherein said data reception unit includes:

a router; and a processor in communication with said router, said processor having a storage unit.

41. The system of claim 15, wherein the cellular infrastructure is a cellular telephone infrastructure.

42. The system of claim 41, wherein said means for transmitting data includes a processor.

43. The system of claim 41, wherein said means for receiving data includes a processor.

44. The method of claim 18, wherein the cellular communications infrastructure is a cellular telephone infrastructure.

45. The method of claim 19, wherein the cellular infrastructure is a cellular telephone infrastructure.

46. The method of claim 45 further comprising receiving said transmitted data at a flight operations center.

47. The method of claim 46 further comprising receiving said transmitted data and transmitting said received data via the Internet before receiving said transmitted data at a flight operations center.

48. The method of claim 46 further comprising receiving said transmitted data and transmitting said received data via the public-switched telephone network before receiving said transmitted data at a flight operations center.

49. The method of claim 45 wherein processing said flight data includes:

compressing said flight data;

encrypting said flight data;

segmenting said flight data; and constructing packets of data from said segmented flight data.

50. The method of claim 45 wherein receiving said transmitted data includes:

acknowledging receipt of said transmitted data;

reassembling said received data;

decrypting said reassembled data;

uncompressing said decrypted data; and storing said uncompressed data.

51. The method of claim 33, wherein the cellular infrastructure is a cellular telephone infrastructure.

* * * * *